United States Patent
Madhani et al.

(10) Patent No.: US 11,042,561 B2
(45) Date of Patent: Jun. 22, 2021

(54) EXTRACTING DATA FROM COMMUNICATIONS RELATED TO DOCUMENTS USING DOMAIN-SPECIFIC GRAMMARS FOR AUTOMATIC TRANSACTION MANAGEMENT

(71) Applicant: INTUIT INC., Mountain View, CA (US)

(72) Inventors: Sunil H. Madhani, Sammamish, WA (US); Joseph J. O'Sullivan, Mountain View, CA (US); Anu Sreepathy, Bangalore (IN)

(73) Assignee: INTUIT INC., Mountain View, CA (US)

( * ) Notice: Subject to any disclaimer, the term of this patent is extended or adjusted under 35 U.S.C. 154(b) by 429 days.

(21) Appl. No.: 14/216,767

(22) Filed: Mar. 17, 2014

(65) Prior Publication Data

US 2015/0261836 A1   Sep. 17, 2015

(51) Int. Cl.
*G06F 16/25* (2019.01)
*G06F 16/93* (2019.01)
*G06F 16/35* (2019.01)

(52) U.S. Cl.
CPC .......... *G06F 16/254* (2019.01); *G06F 16/355* (2019.01); *G06F 16/93* (2019.01)

(58) Field of Classification Search
CPC ......... G06F 17/30563; G06F 17/30011; G06F 16/254; G06F 16/93; G06F 16/355
USPC ........................................................ 707/602
See application file for complete search history.

(56) References Cited

U.S. PATENT DOCUMENTS

| | | | | |
|---|---|---|---|---|
| 7,072,061 B2 * | 7/2006 | Blair | ...................... | G06Q 30/08 358/1.15 |
| 7,603,300 B2 * | 10/2009 | Haffner | .................. | G06Q 30/02 705/30 |
| 7,761,439 B1 * | 7/2010 | Auerbach | ......... | H04L 29/12132 707/706 |
| 7,912,701 B1 * | 3/2011 | Gray | .................... | G06F 16/3344 704/9 |
| 8,041,760 B2 * | 10/2011 | Mamou | .................. | G06F 16/254 709/200 |
| 8,170,953 B1 * | 5/2012 | Tullis | .................. | G06Q 20/4016 705/39 |
| 2002/0077929 A1 * | 6/2002 | Knorr | .................. | G06Q 10/087 705/26.81 |
| 2002/0116205 A1 * | 8/2002 | Ankireddipally | ....... | H04L 67/10 705/26.1 |
| 2008/0027786 A1 * | 1/2008 | Davis | .................. | G06Q 10/0639 705/7.29 |
| 2008/0109326 A1 * | 5/2008 | Meredith | ........... | G06Q 30/0641 705/7.36 |

(Continued)

FOREIGN PATENT DOCUMENTS

WO   2003/058519 A2   7/2003

OTHER PUBLICATIONS

European Seach Report dated Oct. 24, 2016 for Application No. 14880386.9.

*Primary Examiner* — Ashish Thomas
*Assistant Examiner* — Nargis Sultana
(74) *Attorney, Agent, or Firm* — Patterson & Sheridan, LLP

(57) ABSTRACT

The disclosed embodiments provide a system that processes data. During operation, the system obtains a communication associated with a document and extracts data associated with the document from the communication. Next, the system uses the extracted data from the communication and document data from the document to build a context associated with the document. The system then uses the context to facilitate use of the document by a user associated with the communication.

19 Claims, 4 Drawing Sheets

(56) References Cited

U.S. PATENT DOCUMENTS

| | | | |
|---|---|---|---|
| 2008/0133488 A1* | 6/2008 | Bandaru | G06F 16/951 |
| 2009/0216726 A1* | 8/2009 | Muthaiah | G06Q 30/06 |
| 2010/0131523 A1 | 5/2010 | Yu et al. | |
| 2010/0191634 A1* | 7/2010 | Macy | G06N 3/08 |
| | | | 705/35 |
| 2010/0299229 A1* | 11/2010 | Rieger | G06Q 40/12 |
| | | | 705/30 |
| 2010/0306154 A1* | 12/2010 | Poray | H04L 12/4625 |
| | | | 706/47 |
| 2011/0137762 A1* | 6/2011 | Pepe | G06Q 30/06 |
| | | | 705/30 |
| 2011/0295593 A1 | 12/2011 | Raghuveer | |
| 2012/0072280 A1* | 3/2012 | Lin | H04N 5/23222 |
| | | | 705/14.45 |
| 2012/0078610 A1* | 3/2012 | Sayal | G06F 40/279 |
| | | | 704/9 |
| 2012/0330971 A1* | 12/2012 | Thomas | G06F 16/3334 |
| | | | 707/748 |
| 2013/0152092 A1* | 6/2013 | Yadgar | G10L 15/22 |
| | | | 718/102 |
| 2014/0129398 A1* | 5/2014 | Naik | G06Q 40/12 |
| | | | 705/32 |
| 2015/0032521 A1* | 1/2015 | Caiman | G06Q 30/0215 |
| | | | 705/14.17 |
| 2015/0261836 A1* | 9/2015 | Madhani | G06F 16/93 |
| | | | 707/602 |
| 2016/0132915 A1* | 5/2016 | Puranik | G06Q 30/02 |
| | | | 705/7.35 |

\* cited by examiner

EXTRACTING DATA FROM COMMUNICATIONS RELATED TO DOCUMENTS USING DOMAIN-SPECIFIC GRAMMARS FOR AUTOMATIC TRANSACTION MANAGEMENT

BACKGROUND

Related Art

The disclosed embodiments relate to techniques for extracting data. More specifically, the disclosed embodiments relate to techniques for extracting data from communications related to documents.

Data processing and exchange are essential to many business and personal transactions. For example, small businesses may use accounting and/or inventory data to obtain and share reports regarding inventory sales, customer invoices, and/or cash flow. Similarly, healthcare providers may examine medical records to view patient information related to insurance providers, medical conditions, and/or office visits.

In addition, data exchange among users frequently involves the use of documents such as word-processing documents, spreadsheets, and/or Portable Document Format (PDF) documents. For example, a business may manage business transactions with a set of customers by creating a set of bills, invoices, and/or other types of documents containing data associated with the business transactions and transmitting the documents to the respective customers via email. The customers may use the data in the documents to pay the bills and/or invoices, respond to the business, and/or update their records of the transactions.

However, information relevant to document-based transactions is frequently found outside of the documents. As a result, a user that relies solely on information from a document to perform a transaction related to the document may not be aware of other options for performing the transaction, which are specified and/or described outside of the document. For example, a business may send an invoice as an attachment in an email to a customer. The business may also include discounts or promotions related to products or services in the invoice and relevant dates (e.g., deadlines, periods of validity, etc.) for the discounts or promotions in the body of the email. If the customer ignores the email's content and pays the invoice based solely on the amounts and due dates in the invoice, the customer may pay a higher amount than if the customer took advantage of the discounts or promotions in the email.

Consequently, use of documents may be facilitated by mechanisms for supplementing data in the documents with relevant data that is found outside of the documents.

SUMMARY

The disclosed embodiments provide a system that processes data. During operation, the system obtains a communication associated with a document and extracts data associated with the document from the communication. Next, the system uses the extracted data from the communication and document data from the document to build a context associated with the document. The system then uses the context to facilitate use of the document by a user associated with the communication.

In some embodiments, the system also uses information from the communication to obtain an additional communication related to the communication, and includes data from the additional communication in the extracted data.

In some embodiments, extracting the data from the communication involves applying a domain-specific grammar to the communication to obtain the data from the communication.

In some embodiments, using the extracted data and the document data to build the context associated with the communication involves applying the extracted data to the document data to obtain one or more facts and one or more insights, and including the one or more facts and the one or more insights in the context.

In some embodiments, using the context to facilitate use of the document by the user involves at least one of:
(i) providing the context to the user;
(ii) generating a reminder associated with the context;
(iii) recommending a user action based on the context; and
(iv) performing an action for the user based on the context.

In some embodiments, the document includes a financial document.

In some embodiments, the extracted data includes at least one of a discount, a date, and a promotion.

In some embodiments, the communication is at least one of an email, a text message, an instant message, a social-networking post, and a voicemail.

In some embodiments, the document is provided using an attachment or a link in the communication.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for processing data. The data may include document data from a document such as a bill, invoice, form, statement, transcript, record, receipt, and/or tax document. The data may also include data extracted from one or more communications related to the document. For example, the data may be obtained from emails, text messages, instant messages, and/or voicemails and include discounts, promotions, additional terms, verification data, and/or other options related to a transaction associated with the document. As a result, the data may be applied to and/or combined with the document data to improve use of the document data and/or carrying out of a transaction associated with the document by a user.

Figure 1:
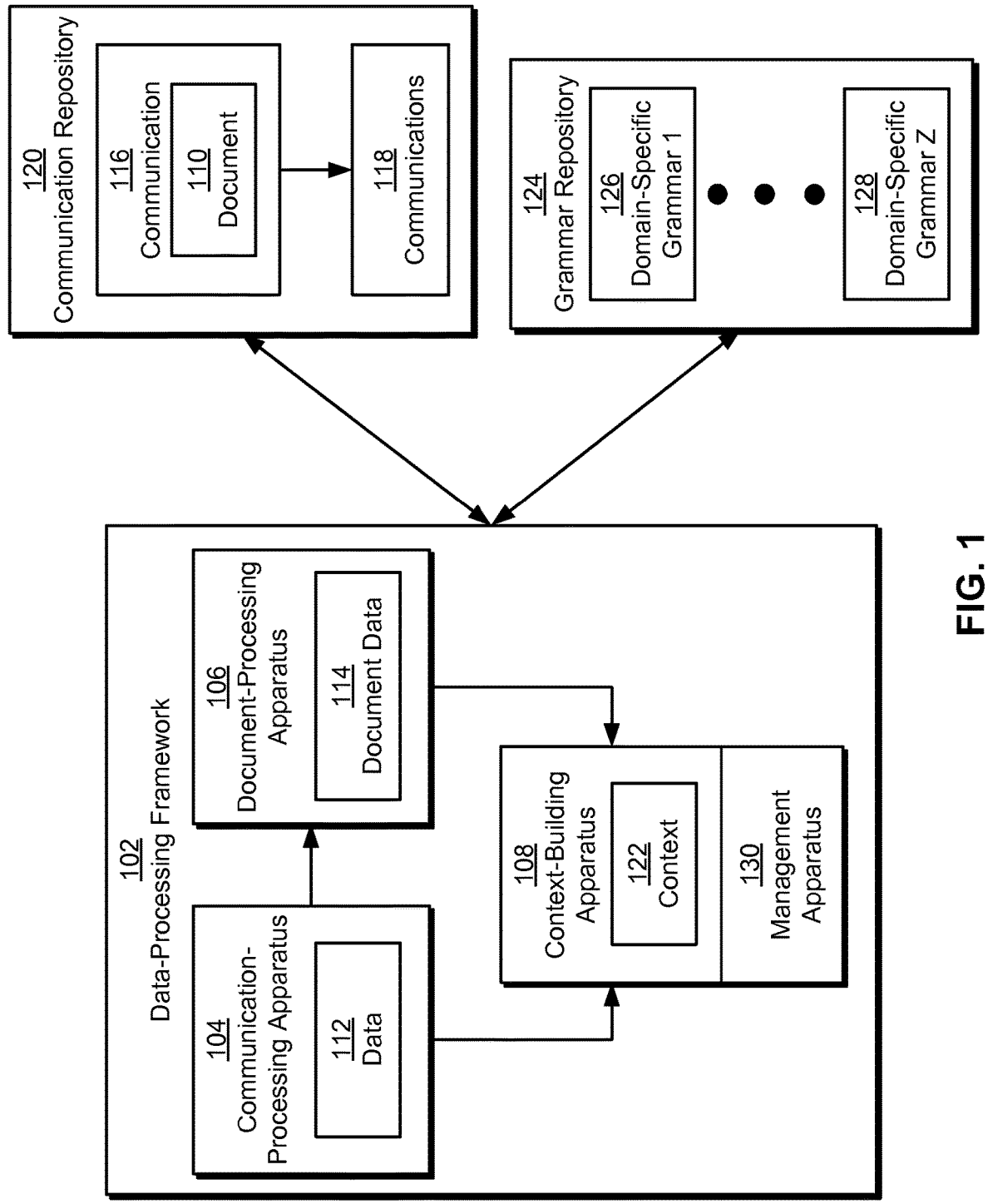
FIG. 1 shows a schematic of a system in accordance with the disclosed embodiments.

As shown in FIG. 1, the data may be included in a document 110 such as a word-processing document, spreadsheet, Portable Document Format (PDF) document, web page, and/or another type of digitized document. For example, document 110 may be a bill, invoice, form, statement, transcript, record, receipt, tax document, and/or other type of document that includes a specific type and/or set of data. Document 110 may be generated digitally using a word-processing application, spreadsheet application, diagramming application, graphics-editing application, and/or other application for creating electronic documents. Alternatively, document 110 may correspond to a scanned and/or photographed digital copy of a physical document.

In one or more embodiments, the system of FIG. 1 includes functionality to automatically extract data from document 110 without requiring use of a template and/or custom code for extracting the data. As shown in FIG. 1, the system may correspond to a data-processing framework 102 that provides a document-processing apparatus 106 for obtaining document data 114 from document 110. For example, document-processing apparatus 106 may analyze the contexts of individual words in document 110 and store data associated with the words and contexts in a set of data elements and tags. As a result, document-processing apparatus 106 may be capable of obtaining document data 114 from document 110 in the absence of a template that specifies the locations of data elements in document 110. Alternatively, if a template for document 110 is available, document-processing apparatus 106 may use the template to extract document data 114 from document 110.

Document data 114 from document 110 may then be used in a transaction involving two or more users. For example, a business owner may provide an invoice to a customer as an attachment in an email. The customer may download the attachment, open the invoice, and use information in the invoice to pay the business owner for goods or services specified in the invoice. Moreover, if document data 114 has been extracted from the invoice by document-processing apparatus 106, document data 114 may be provided to a management apparatus 130 in data-processing framework 102 and/or a financial-management application associated with data-processing framework 102. Management apparatus 130 and/or the application may use document data 114 to generate one or more payment reminders for the invoice and/or schedule a payment of the invoice for the customer.

Those skilled in the art will appreciate that additional information related to document 110 may be found in one or more communications 116-118 associated with document 110. The additional information may facilitate use of document 110 and/or carrying out of a transaction associated with document 110. Continuing with the above example, the business owner may specify additional terms associated with the invoice in the body of the email. The business owner may also inform the customer of discounts or promotions related to the invoice in the same email and/or in a separate email to the customer. Additional discounts, promotions, and/or options associated with payment of the invoice may further be found in emails from other senders, such as "daily deal" websites and/or affiliates. Thus, if the customer pays the invoice based solely on the amounts and/or due dates in the invoice, the customer may pay a higher amount than if the customer took advantage of the discounts or promotions in the email(s).

In one or more embodiments, data-processing framework 102 includes functionality to enhance and/or supplement document data 114 with additional data 112 extracted from one or more communications 116-118 associated with document 110. In turn, the additional data 112 may facilitate use of document 110 and/or participation in a transaction associated with document 110 by a user associated with document 110.

More specifically, a communication-processing apparatus 104 may obtain communication 116 associated with document 110 and extract data 112 associated with document 110 from communication 116. Communication 116 may include an email, text message, instant message, voicemail, and/or other form of digital and/or digitized communication involving two or more users. Communication 116 may be stored in a communication repository 120 with one or more additional communications 118. For example, communications 116-118 may be obtained from an email inbox, a text or instant message thread, a voicemail inbox, cloud storage, and/or a backup mechanism. A crawler associated with communication-processing apparatus 104 may detect the arrival of new communications in communication repository 120, or the crawler and/or communication-processing apparatus 104 may periodically obtain and process batches of communications from communication repository 120.

Communication-processing apparatus 104 may also use communication 116 to obtain document 110. For example, communication-processing apparatus 104 may obtain document 110 as an attachment to communication 116. Alternatively, communication-processing apparatus 104 may access document 110 through a link and/or reference to document 110 in communication 116. Communication-processing apparatus 104 may provide document 110 to document-processing apparatus 106 for extraction of document data 114 from document 110, as described above and in the above-referenced application.

To extract data 112 from communication 116, communication-processing apparatus 104 may scan communication 116 to obtain a sender, recipient, and/or document 110 from communication 116. Communication-processing apparatus 104 may also detect a domain related to communication 116 based on one or more keywords found in communication 116. For example, communication-processing apparatus 104 may use a natural-language-processing (NLP) technique to parse text in communication 116 and identify the sender, recipient, and/or document 110 associated with communication 116. Communication-processing apparatus 104 may also match keywords in the parsed sentences to one or more domains (e.g., application domains, business domains, etc.) supported by data-processing framework 102. If communication 116 is not text-based (e.g., voicemail, video chat, phone call, etc.), communication-processing apparatus 104 and/or another component of data-processing framework 102 may use a speech-recognition technique and/or another mechanism to convert communication 116 into text before scanning communication 116.

Next, communication-processing apparatus 104 may apply a domain-specific grammar (e.g., domain-specific grammar 1 126, domain-specific grammar z 128) to communication 116 to obtain domain-specific words and/or data 112 from communication 116. For example, communication-processing apparatus 104 may obtain one or more domain-specific grammars for domains matched by keywords in communication 116 from a grammar repository 124. Communication-processing apparatus 104 may use the domain-specific grammar(s) to detect structures in communication 116 represented by the domain-specific grammar(s) and extract data elements from the structures, as described in further detail below with respect to FIG. 2.

Communication-processing apparatus 104 may additionally use data 112 and/or other information from communication 116 to identify and/or obtain one or more additional communications 118 related to communication 116. For example, communication-processing apparatus 104 may obtain additional communications 118 associated with the same sender and/or domain as communication 116. As with communication 116, communication-processing apparatus 104 may parse communications 118 and/or apply domain-specific grammars to communications 118 to obtain additional data from communications 118. Communication-processing apparatus 104 may then supplement data 112 with the additional data.

After data 112 is extracted from communication 116 and/or related communications 118, a context-building apparatus 108 in data-processing framework 102 may build a context 122 associated with document 110 using data 112 and document data 114 from document-processing apparatus 106. In particular, context-building apparatus 108 may apply data 112 to document data 114 to obtain context 122 as one or more facts and/or one or more insights. For example, context-building apparatus 108 may apply a discount found in communication 116 and/or communications 118 to an amount due in an invoice to obtain a discounted amount for the invoice and/or a pay-by date for the discounted amount.

Finally, a management apparatus 130 in data-processing framework 102 may use context 122 to facilitate use of document 110 by a user associated with communication 116. Management apparatus 130 may provide facts and/or insights from context 122 to the user. For example, management apparatus 130 may inform the user of the facts and/or insights from context-building apparatus 108 in one or more notifications. Management apparatus 130 may also generate a reminder associated with context 122. For example, management apparatus 130 may remind the user of a due date and/or deadline associated with document 110 prior to the due date and/or deadline. Finally, management apparatus 130 may recommend a user action and/or perform an action for the user based on context 122. For example, management apparatus 130 may recommend payment of a bill or invoice during a period associated with a discount on the bill or invoice, or management apparatus 130 may automatically schedule a payment to occur within the period to ensure that the user receives the discount.

By supplementing document data (e.g., document data 114) from documents (e.g., document 110) with data (e.g., data 112) extracted from communications (e.g., communications 116-118) related to the documents, data-processing framework 102 may enable better understanding and use of information in the documents by users associated with the documents. In turn, data-processing framework 102 may optimize subsequent communications and/or transactions associated with the documents for the users, thus reducing overhead and/or inefficient handling of the transactions by the users.

Those skilled in the art will appreciate that the system of FIG. 1 may be implemented in a variety of ways. First, communication-processing apparatus 104, document-processing apparatus 106, context-building apparatus 108, management apparatus 130, and grammar repository 124 may be provided by a single physical machine, multiple computer systems, a grid, one or more databases, one or more file-systems, and/or a cloud computing system. In addition, communication-processing apparatus 104, document-processing apparatus 106, context-building apparatus 108, and/or management apparatus 130 may be provided by the same hardware and/or software component or execute independently from one another. For example, communication-processing apparatus 104, document-processing apparatus 106, context-building apparatus 108, and management apparatus 130 may form a part of an application that is used to process and manage data from a set of documents and related communications for a user. On the other hand, one or more components of data-processing framework 102 may execute outside the application and provide data from the documents and/or communications in a form that can be used by the application and/or other applications after the data is extracted from the documents and/or communications.

Second, data-processing framework 102 may be configured for use with various types of electronic documents, communications, and/or data. For example, data-processing framework 102 may accept multiple types and/or file formats of documents and/or include functionality to convert the documents into a file format that is suitable for text and/or data extraction. Along the same lines, data-processing framework 102 may be capable of extracting data from various types of communications, including text-based communications (e.g., emails, text messages, instant messages, social-networking posts, forum messages, etc.) and/or other types of communications (e.g., phone calls, video chats, voicemails, etc.). Data-processing framework 102 may further obtain and/or store data 112, document data 114, and/or domain-specific grammars as relational-database records, property lists, Extensible Markup Language (XML) documents, JavaScript Object Notation (JSON) objects, and/or other types of structured data.

Figure 2:
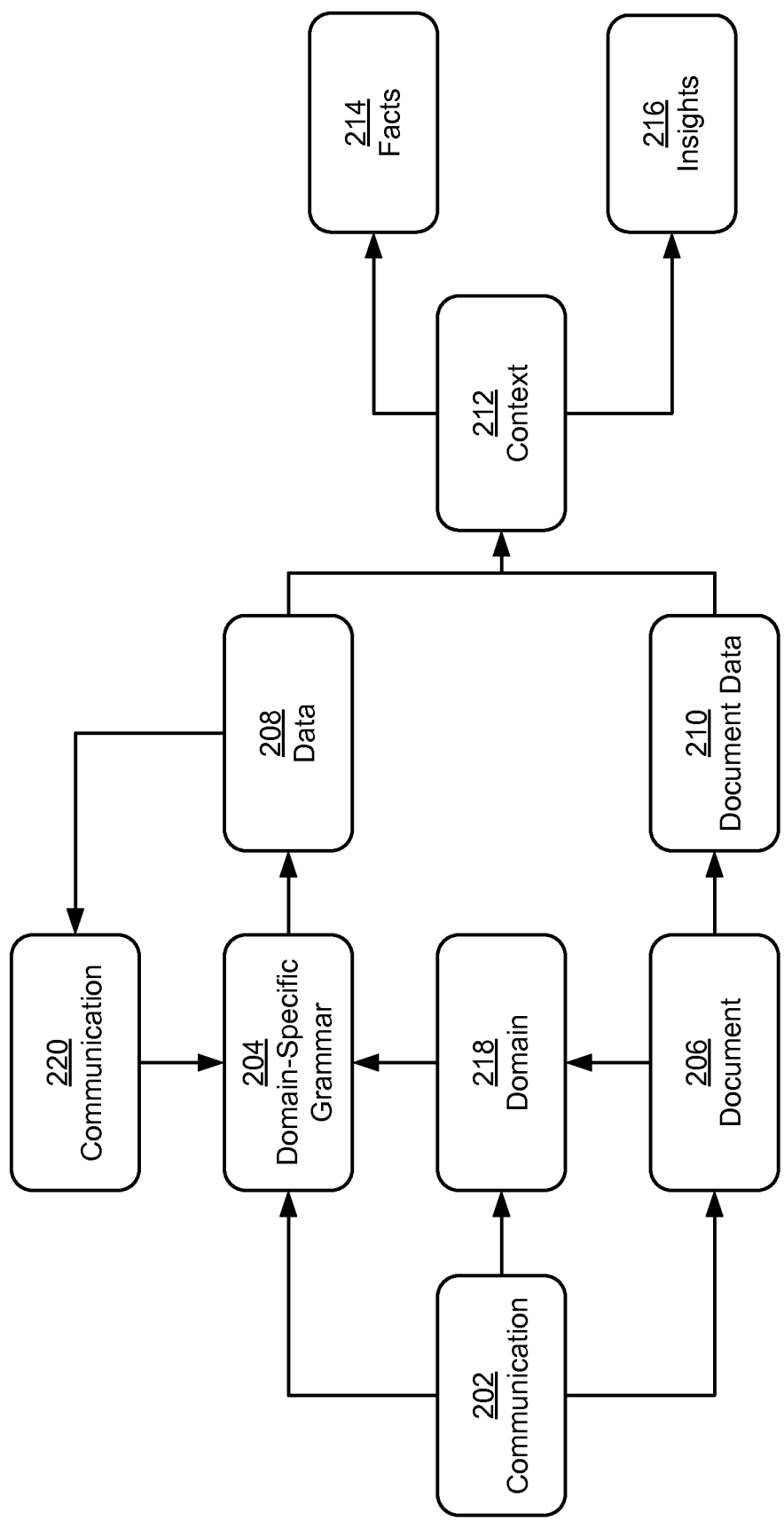
FIG. 2 shows the creation of a context associated with a document in accordance with the disclosed embodiments.

FIG. 2 shows the creation of a context 212 associated with a document 206 in accordance with the disclosed embodiments. As mentioned above, document 206 may be obtained from a communication 202 such as an email, text message, instant message, social-networking post, and/or voicemail. For example, document 206 may be included in communication 202 as an attachment, or document 206 may be obtained using a link and/or reference in communication 202. Document data 210 may also be extracted from document 206, with or without a template for document 206.

Next, communication 202 may be scanned to obtain information such as a sender, recipient, and/or domain 218 associated with communication 202. For example, an NLP technique may be used to identify the sender, recipient, and/or other entities associated with an email containing an invoice. The NLP technique may also match one or more keywords (e.g., "invoice," "pay," "payment," "business," etc.) in the email and/or invoice to a domain related to invoice processing and/or financial transactions.

A domain-specific grammar 204 for domain 218 may also be applied to communication 202 to obtain data 208 associated with document 206. For example, a domain-specific grammar for invoice processing may include the following:

INVOICE [
DISCOUNT:x
DATE:d
AMOUNT:a
DISTANCE:r
(Avail x% discount if paid by d)
(Get a discount of a <filler>)
(Obtain a [rebate|discount] of [x%|a] as <filler>) (x% off if paid via <filler>)
(x% waived <filler> shipping is within r miles)
(No shipping cost<filler>for order [more|greater|higher] than a)
]

As a result, the domain-specific grammar may specify one or more structures that allow data 208 (e.g., discount, date, amount, distance) related to discounts and/or promotions for an invoice to be extracted from text in communication 202. The domain-specific grammar 204 may then be applied to a sentence such as "Avail 5% discount if paid before Nov. 20, 2013" to obtain a discount of 5% and a date of "Nov. 20, 2013" from the sentence.

Domain 218, data 208, and/or other information from communication 202 may further be used to obtain an additional communication 220 related to communication 202. Domain-specific grammar 204 and/or another domain-specific grammar may be applied to communication 220, and data extracted from communication 220 may be included in data 208. If more communications related to communication 202 are found, the domain-specific grammar(s) may also be applied to the communications, and data extracted from the communications may be added to data 208.

Data 208 extracted from communication 202 and/or communication 220 and document data 210 from document 206 may then be used to build context 212. In particular, data 208 may be applied to document data 210 to obtain one or more facts 214 and one or more insights 216 that are included in context 212. For example, document data 210 for an invoice may include the following:

Vendor name—John's Furnishings
Due Date—Nov. 30, 2013
Bill Date—Oct. 20, 2013
Amount Due—$546.08
Line Item 1—Window blinds $380.00
Line Item 2—Cushions $166.08

Similarly, data 208 from communication 202 and/or communication 220 may include a discount of 10% and a due date of Nov. 20, 2013. Data 208 may then be applied to document data 210 to obtain an insight containing a discounted amount of $491.48 and a pay-by date for the discounted amount of Nov. 20, 2013. Data 208, document data 210, and/or the insight may then be provided to a user in the following form:

"$546.08 due to John's Furnishings by Nov. 30, 2013. Pay only $491.48 if paid by Nov. 20, 2013."

Consequently, context 212 may include additional information that is relevant to the invoice but not present in the invoice. The additional information may allow the user to take advantage of a discount that the user may otherwise be unaware of, thus facilitating use and/or payment of the invoice by the user.

Figure 3:
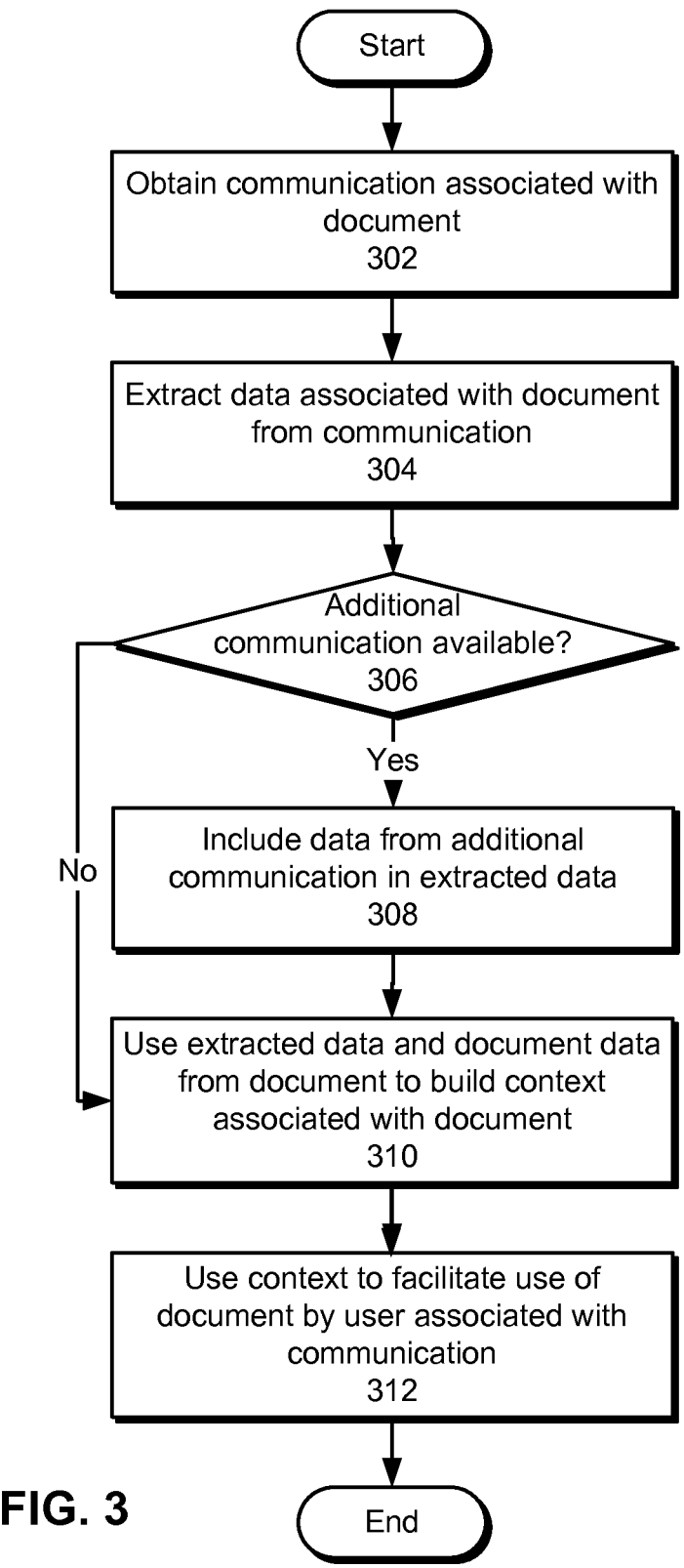
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a communication associated with a document is obtained (operation 302). The communication may be an email, a text message, an instant message, a social-networking post, a voicemail, and/or another type of digital or digitized communication. Next, data associated with the document is extracted from the communication (operation 304). For example, a domain-specific grammar may be applied to the communication to identify structures in the communication and obtain data from the structures.

An additional communication related to the communication may be available (operation 306). For example, the additional communication may be obtained using information (e.g., sender, recipient, domain, keywords, etc.) and/or data from the communication. If an additional communication is available, data from the additional communication is included in the extracted data (operation 308). For example, the domain-specific grammar may be applied to the additional communication to obtain additional data related to the communication and/or document. If no additional communication is available, no additional data is included in the data extracted from the communication.

The extracted data and document data from the document are then used to build a context associated with the document (operation 310). For example, the extracted data may be applied to the document data to obtain one or more facts and one or more insights, and the fact(s) and/or insight(s) may be included in the context.

Finally, the context is used to facilitate use of the document by a user associated with the communication (operation 312), such as a recipient of the communication. To facilitate use of the document by the user, the context may be provided to the user to notify the user of the facts and/or insights obtained from the extracted data and/or document data. For example, the user may be notified of available discounts or promotions, errors or discrepancies, and/or changes in terms or additional terms associated with the document. A reminder associated with the context may also be generated to allow the user to take advantage of the insights in a timely manner. For example, a reminder may be generated to remind the user of a pay-by date for a discount or promotion. Finally, the context may be used to recommend a user action and/or perform an action for the user. For example, the user may be provided with a phone number and/or email address for contacting another user associated with the document or communication if an error or discrepancy is found in the document or communication. Alternatively, an email requesting review or explanation of the error or discrepancy may be automatically generated and sent to the other user on the user's behalf.

Figure 4:
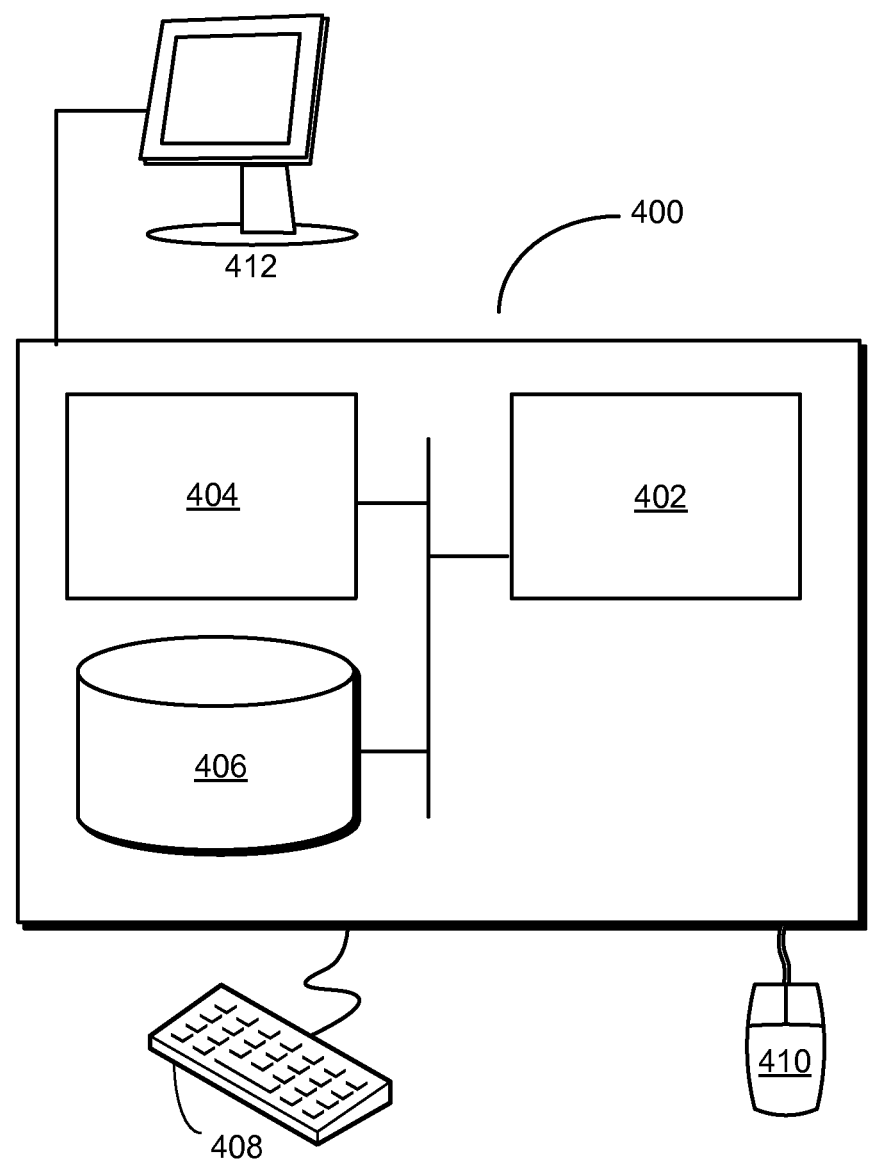
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system may include a communication-processing apparatus that obtains a communication associated with a document and extracts data associated with the document from the communication. The system may also include a context-building apparatus that uses the extracted data from the communication and document data from the document to build a context associated with the document. Finally, the system may include a management apparatus that uses the context to facilitate use of the document by a user associated with the communication.

In addition, one or more components of computer system 400 may be remotely located and connected to the other components over a network. Portions of the present embodiments (e.g., communication-processing apparatus, context-building apparatus, management apparatus, etc.) may also be located on different nodes of a distributed system that implements the embodiments. For example, the present embodiments may be implemented using a cloud computing system that extracts data from communications related to a set of documents and uses the extracted data to facilitate use of the documents by a set of remote users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
    obtaining a first communication associated with a document specifying transaction details for a pending transaction, wherein the document comprises one of: a bill, an invoice, a form, a statement, a transcript, a record, a receipt, or a tax document;
    scanning the first communication to identify one or more keywords;
    determining a domain of the first communication based on the one or more keywords;
    applying a domain-specific grammar to the first communication, wherein the domain-specific grammar corresponds to the domain of the first communication, and wherein the domain-specific grammar specifies one or more structures related to the domain;
    extracting data associated with the pending transaction from the first communication by using the domain-specific grammar to detect at least one structure of the one or more structures related to the domain in one or more sentences of the first communication and extract elements of the data from the one or more sentences;
    building a context for the pending transaction based on the data extracted from the first communication using the domain-specific grammar and based on the transaction details specified in the document, wherein the context provides information characterizing the pending transaction and the first communication;
    determining, from the context, one or more actions that are applicable to the pending transaction;
    performing at least one of the actions to the pending transaction, wherein the at least one of the actions comprises automatically scheduling a payment within a period determined based on the information in the context; and
    presenting the context to a user associated with the document.

2. The computer-implemented method of claim 1, further comprising:
    using information from the first communication to obtain a second communication; and
    including data from the second communication and the data extracted from the first communication in the context.

3. The computer-implemented method of claim 1, wherein building the context includes:
    applying the data extracted from the first communication to the transaction details to obtain one or more facts and one or more insights regarding the pending transaction; and
    including the one or more facts and the one or more insights in the context.

4. The computer-implemented method of claim 1, wherein the data extracted from the first communication comprises at least one of: a discount; a date; or a promotion.

5. The computer-implemented method of claim 1, wherein the first communication is at least one of an email, a text message, an instant message, a social-networking post, and a voicemail.

6. The computer-implemented method of claim 1, wherein the document is provided using an attachment or a link in the first communication.

7. The method of claim 1, wherein the first communication and the document are associated with a party participating in the pending transaction.

8. A system, comprising:
    one or more processors; and
    a non-transitory computer-readable medium comprising instructions that, when executed by the one or more processors, cause the system to perform a method, the method comprising:
        obtaining a first communication associated with a document specifying transaction details for a pending transaction, wherein the document comprises one of: a bill, an invoice, a form, a statement, a transcript, a record, a receipt, or a tax document;
        scanning the first communication to identify one or more keywords;
        determining a domain of the first communication based on the one or more keywords;
        applying a domain-specific grammar to the first communication, wherein the domain-specific grammar corresponds to the domain of the first communication, and wherein the domain-specific grammar specifies one or more structures related to the domain;

extracting data associated with the pending transaction from the first communication by using the domain-specific grammar to detect at least one structure of the one or more structures related to the domain in one or more sentences of the first communication and extract elements of the data from the one or more sentences;

building a context for the pending transaction based on the data extracted from the first communication using the domain-specific grammar and based on the transaction details specified in the document, wherein the context provides information characterizing the pending transaction and the first communication;

determining, from the context, one or more actions that are applicable to the pending transaction;

performing at least one of the actions to the pending transaction, wherein the at least one of the actions comprises automatically scheduling a payment within a period determined based on the information in the context; and presenting the context to a user associated with the document.

9. The system of claim 8, wherein the method further comprises:

extracting the transaction details from the document.

10. The system of claim 8, wherein the method further comprises:

obtaining a second communication; and including data from the second communication and the data extracted from the first communication in the context.

11. The system of claim 8, wherein building the context for the pending transaction comprises:

applying the data extracted from the first communication to the transaction details to obtain one or more facts and one or more insights regarding the pending transaction; and including the one or more facts and the one or more insights in the context.

12. The system of claim 8, wherein the data extracted from the first communication comprises at least one of: a discount; a date; or a promotion.

13. The system of claim 8, wherein the first communication is at least one of an email, a text message, an instant message, a social-networking post, and a voicemail.

14. The system of claim 8, wherein the document is provided using an attachment or a link in the first communication.

15. A non-transitory computer-readable storage medium comprising instructions that when executed by a computer, cause the computer to perform a method for processing data, the method comprising:

obtaining a first communication associated with a document specifying transaction details for a pending transaction, wherein the document comprises one of: a bill, an invoice, a form, a statement, a transcript, a record, a receipt, or a tax document;

scanning the first communication to identify one or more keywords;

determining a domain of the first communication based on the one or more keywords;

applying a domain-specific grammar to the first communication, wherein the domain-specific grammar corresponds to the domain of the first communication, and wherein the domain-specific grammar specifies one or more structures related to the domain;

extracting data associated with the pending transaction from the first communication by using the domain-specific grammar to detect at least one structure of the one or more structures related to the domain in one or more sentences of the first communication and extract elements of the data from the one or more sentences;

building a context for the pending transaction based on the data extracted from the first communication using the domain-specific grammar and based on the transaction details specified in the document, wherein the context provides information characterizing the pending transaction and the first communication;

determining, from the context, one or more actions that are applicable to the pending transaction;

performing at least one of the actions to the pending transaction, wherein the at least one of the actions comprises automatically scheduling a payment within a period determined based on the information in the context; and presenting the context to a user associated with the document.

16. The non-transitory computer-readable storage medium of claim 15, the method further comprising:

using information from the first communication to obtain a second communication; and including data from the second communication and the data extracted from the first communication in the context.

17. The non-transitory computer-readable storage medium of claim 15, wherein building the context for the pending transaction includes:

applying the data extracted from the first communication to the data from the document to obtain one or more facts and one or more insights; and including the one or more facts and the one or more insights in the context.

18. The non-transitory computer-readable storage medium of claim 15, wherein the first communication is at least one of an email, a text message, an instant message, a social-networking post, and a voicemail.

19. The non-transitory computer-readable storage medium of claim 15, wherein the document is provided using an attachment or a link in the first communication.

* * * * *